United States Patent Office 2,756,243
Patented July 24, 1956

2,756,243

TREATMENT OF NICKEL CATALYST TO PREVENT NUCLEAR HYDROGENATION OF ANTHRAQUINONES

Robert R. Umhoefer, Kenmore, N. Y., assignor, by mesne assignments, to Food Machinery and Chemical Corporation, San Jose, Calif., a corporation of Delaware No Drawing. Application July 12, 1954, Serial No. 442,901

9 Claims. (Cl. 260—369)

This invention constitutes an improvement in the method of preparing a selectively-acting nickel hydrogenation catalyst suitable for the production of hydroquinones from quinones, particularly when such catalysts are used to hydrogenate quinones in the autoxidation process for the production of hydrogen peroxide.

In such a cyclic process, quinones such as naphthoquinones, anthraquinones, alkylanthraquinones, phenanthraquinones and others, employed as the working material, can be alternately hydrogenated and oxidized repeatedly. The so-called anthraquinone process is described in PB Report No. 395 and U. S. Patent No. 2,215,883. However, these quinones are subject to overhydrogenation whereby hydrogen is introduced into the nucleus forming, in the case of the anthraquinones, a tetrahydro derivative. This is an undesirable side reaction of the process as the tetrahydroquinones differ in properties from the original quinone and after a period of time the characteristics of the process solution will change.

In my copending applications Serial Numbers 278,739, filed March 26, 1952, and 305,711 and 305,712, each filed August 21, 1952, now Patents 2,720,531 and 2,720,532, respectively, methods are described for treating the nickel catalyst in a manner which will result in a change of catalyst activity so that nuclear hydrogenation will be prevented although hydrogenation of the quinone to hydroquinone is not interfered with. The treatment described in my copending applications utilize as catalyst modifiers, amines, nitriles and nitrates. Other modifying agents known in the art are, for example, salts of formic acid.

All these modifying agents have certain disadvantages.

Thus, when a nickel catalyst which contains one of these agents is added to the hydrogenation part of the cycle, the compound is carried by the hydroquinone solution into the oxidizers where, in the presence of oxygen and hydrogen peroxide, it may be subject to oxidation to acidic compounds including nitric acid, which are corrosive if metallic materials of construction, such as stainless steel be used. This is particularly so as a reducing condition is provided in parts of the oxidizers by the hydroquinone solution. Also, in the case of using an amine or amine precursor as an inhibiting agent, the initially alkaline reaction condition would be favorable to oxidation of the amine by the hydrogen peroxide to form ultimately acidic compounds.

It is a purpose of this invention to provide a catalyst treatment which is essentially neutral or nonalkaline in reaction and thus does not promote either the oxidation of organic materials by hydrogen peroxide or the decomposition of the hydrogen peroxide.

It is a further object to provide a catalyst treatment whereby the agent used is to a large extent substantially inert toward oxidation.

It is a further object to provide a buffer type of agent that will tend to nullify or reduce the formation of acid products and thus reduce the tendency toward corrosion.

It is a further object of the invention that the agent shall additionally act as a corrosion inhibitor.

Such objectives can be obtained by treating the catalyst with a composition comprising pyridine, a pyridine carboxylic acid and a strongly basic compound in amount sufficient to produce a substantially neutral solution. The pyridine carboxylic acid may be any of the monocarboxylic acids or dicarboxylic acids, as for instance picolinic, nicotinic acid, isonicotinic acid, dipicolinic acid, and the like. The material employed for producing a substantially neutral solution may comprise any strongly alkaline material soluble in the composition. The preferred alkali may be a hydroxide of an alkaline earth metal, as for instance sodium hydroxide, or may be an organic base, a preferred base being one which in and of itself aids in producing the desired result, as for instance an aliphatic amine.

Both pyridine and the pyridine carboxylic acids are resistant to oxidation. Although pyridine is slightly alkaline, the dissociation constants of the pyridine carboxylic acids are so much greater than that of pyridine that mixtures of a pyridine carboxylic acid and pyridine are acidic even when the mixture contains a ten-fold molar excess of pyridine. It is preferable, therefore, to produce the desired substantial neutrality in the mixture by including therein the basic material such as the alkali metal hydroxide or an aliphatic amine.

A typical mixture for treating Raney nickel catalyst thus consists of one mole of a pyridine carboxylic acid, one mole of an aliphatic amine and two moles of pyridine. Such a mixture is essentially neutral in reaction and effective in inhibiting the formation of tetrahydroquinones by means of nuclear hydrogenation without affecting the rate of hydroquinone formation by hydrogenation of the quinone. When subjected to oxidizing conditions, such a mixture is buffered against the creation of strongly acid conditions by the pyridine which also acts as a corrosion inhibitor.

In the preferred method of practicing the invention, the nickel catalyst, as for instance that of the porous type—the so-called Raney—is treated with the catalyst modifying composition by immersing the catalyst in a solvent medium in which is dissolved a small amount of pyridine, pyridine carboxylic acid and alkali sufficient to produce a non-acid environment. After standing in the catalyst modifying composition for a time sufficient completely to impregnate the catalyst with the modifying composition, the catalyst is removed and is ready for use for the hydrogenation of the quinone selected as the working material, which working material is normally carried in a solvent mixture containing a constituent for dissolving the quinone form of the working material and a constituent for dissolving the hydroquinone form of the working material, all as well understood in the art.

The catalyst modifying agent effectively acts to inhibit nuclear hydrogenation if it be added to the mixed solvent employed as the working solution and in which is carried the particular quinone employed as the working material in the so-called cyclic anthraquinone auto-oxidation process.

The principles of the invention are illustrated in the following examples with the exception of Example 1 which illustrates the usual hydrogenation employing a Raney nickel catalyst not treated with any catalyst modifying agent and employing a solvent mixture in which no such modifying agent is present. Although it is well understood in this art that a variety of quinones can be employed, 2-ethylanthraquinone has been illustrated as the working material by reason of the fact that that particular compound has been employed commercially in the cyclic hydrogenation and auto-oxidation of the resultant hydroquinone for the production of hydrogen peroxide.

Example 1

A Raney nickel catalyst not treated in accordance with this invention was used to cause hydrogenation of 0.8 g. of 2-ethylanthraquinone dissolved in 20 ml. of a solvent mixture consisting of equal parts of ethylbenzene and tributyl phosphate. The quinone was shaken in this mixture with the Raney nickel catalyst at 30° C. under a hydrogen pressure of 750 mm. Hydrogen was absorbed at a rate corresponding to 62 ml./minute/gram of catalyst during the formation of 2-ethylanthrahydroquinone. After sufficient hydrogen absorption so that all the quinone had reacted in this manner, hydrogen absorption continued but at a rate corresponding to 0.59 ml./minute/gram of catalyst. This additional hydrogen absorption at the reduced rate corresponds to the formation of an equivalent amount of tetrahydro-2-ethylanthrahydroquinone. This second hydrogenation step corresponds, therefore, to nuclear hydrogenation.

Example 2

Another sample of the same Raney nickel catalyst as used in Example 1 was, prior to use, treated with an equal volume of isopropyl alcohol in which was dissolved two per cent on the weight of the catalyst of a mixture of one part of nicotinic acid, 2 parts pyridine and one part of morpholine, a solution which was substantially neutral. The catalyst was mixed with that solution and left standing for 24 hours at room temperature. The required amount of catalyst was then withdrawn from the mixture and used in the same manner as described in Example 1, to hydrogenate 0.8 g. of 2-ethylanthraquinone. Hydrogen was absorbed at a rate corresponding to 76 ml./minute/gram of catalyst during the formation of 2-ethylanthrahydroquinone. Thereafter no further absorption of hydrogen took place, indicating that nuclear hydrogenation was completely prevented.

Example 3

Hydrogenation was carried out in a manner described in Example 1 but, in this instance, the Raney nickel catalyst was suspended in the quinone solution containing a fraction of a per cent of a catalyst modifier, the modifier comprising one part of picolinic acid, 2 parts pyridine and one part piperidine. Hydrogen take-up ceased after the quantity of hydrogen necessary for formation of hydroquinone had been absorbed.

Example 4

Another sample of the same Raney nickel catalyst as used in Example 1 was treated, prior to use, with an equal volume of isopropyl alcohol in which was dissolved 2 per cent on the weight of the catalyst of a mixture of one part of picolinic acid, 2 parts pyridine and one part of morpholine. The catalyst was mixed with that solution and left standing for 24 hours at room temperature. The required amount of catalyst was then withdrawn from the mixture and used in the same manner as described in Example 1, to hydrogenate 0.8 of 2-ethylanthraquinone. Hydrogen was absorbed at a rate corresponding to 76 ml./minute/gram of catalyst during the formation of 2-ethylanthrahydroquinone. Thereafter no further absorption of hydrogen took place, indicating that nuclear hydrogenation was completely prevented.

Example 5

Another sample of the same Raney nickel catalyst as used in Example 1, was treated with an equal volume of isopropyl alcohol in which was dissolved 2 per cent on the weight of the catalyst of a mixture of one part of isonicotinic acid, 2 parts pyridine and one part of morpholine. The catalyst was mixed with that solution and left standing for 24 hours at room temperature. The required amount of catalyst was then withdrawn from the mixture and used in the same manner as described in Example 1, to hydrogenate 0.8 g. of 2-ethylanthraquinone. Hydrogen was absorbed at a rate corresponding to 76 ml./minute/gram of catalyst during the formation of 2-ethylanthrahydroquinone. Thereafter no further absorption of hydrogen took place, indicating that nuclear hydrogenation was completely prevented.

Example 6

Another sample of the same Raney nickel catalyst as used in Example 1, was treated with an equal volume of isopropyl alcohol in which was dissolved 2 per cent on the weight of the catalyst of a mixture of one part of nicotinic acid, 2 parts pyridine and one part triethylamine. The catalyst was mixed with that solution and left standing for 24 hours at room temperature. The required amount of catalyst was then withdrawn from the mixture and used in the same manner as described in Example 1, to hydrogenate 0.8 g. of 2-ethylanthraquinone. Hydrogen was absorbed at a rate corresponding to 76 ml./minute/gram of catalyst during the formation of 2-ethylanthrahydroquinone. Thereafter no further absorption of hydrogen took place, indicating that nuclear hydrogenation was completely prevented.

Example 7

Another sample of the same Raney nickel catalyst as used in Example 1, was treated with an equal volume of isopropyl alcohol in which was dissolved 2 per cent on the weight of the catalyst of a mixture of one part of nicotinic acid, 2 parts pyridine and one part of piperidine. The catalyst was mixed with that solution and left standing for 24 hours at room temperature. The required amount of catalyst was then withdrawn from the mixture and used in the same manner as described in Example 1, to hydrogenate 0.8 g. of 2-ethylanthraquinone. Hydrogen was absorbed at a rate corresponding to 76 ml./minute/gram of catalyst during the formation of 2-ethylanthrahydroquinone. Thereafter no further absorption of hydrogen took place, indicating that nuclear hydrogenation was completely prevented.

What is claimed is:

1. In the process of hydrogenating an anthraquinone to anthrahydroquinone in a solvent medium containing a Raney nickel hydrogenation catalyst, the improvement which comprises preventing hydrogenation of the quinone nucleus by performing the hydrogenation with nickel catalyst in contact with a mixture of pyridine and pyridine carboxylic acid, said mixture containing a quantity of an organic base sufficient to substantially neutralize the acidic components of the mixture.

2. In the process of hydrogenating an anthraquinone to anthrahydroquinone in a solvent medium containing a Raney nickel hydrogenation catalyst, the improvement which comprises preventing hydrogenation of the quinone nucleus by performing the hydrogenation reaction in the solvent medium while having present in said medium a mixture of pyridine and pyridine carboxylic acid, said mixture containing a quantity of an organic base sufficient to substantially neutralize the acidic components of the mixture.

3. In the process of hydrogenating an anthraquinone to anthrahydroquinone in a solvent medium containing a Raney nickel hydrogenation catalyst, the improvement which comprises preventing hydrogenation of the quinone nucleus by treating the nickel catalyst prior to use with a mixture of pyridine and pyridine carboxylic acid, said mixture containing a quantity of an organic base sufficient to substantially neutralize the acidic components of the mixture.

4. The process of claim 3 in which the organic base is morpholine.

5. The process of claim 3 in which the organic base is triethylamine.

6. The process of claim 3 in which the organic base is piperidine.

7. The process of claim 3 in which the pyridine carboxylic acid is nicotinic acid.

8. The process of claim 3 in which the pyridine carboxylic acid is picolinic acid.

9. The process of claim 3 in which the pyridine carboxylic acid is isonicotinic acid.

References Cited in the file of this patent

UNITED STATES PATENTS

| | | |
|---|---|---|
| 2,495,521 | Hannion et al. | Jan. 24, 1950 |
| 2,602,092 | Oroshnik | July 1, 1952 |